(12) United States Patent
Murphy et al.

(10) Patent No.: US 12,466,148 B2
(45) Date of Patent: Nov. 11, 2025

(54) TRIM PRESS HANDLER SYSTEM

(71) Applicant: NAS Nalle Automation Systems, LLC, Knoxville, TN (US)

(72) Inventors: Jeffrey M. Murphy, Beaverton, MI (US); David J. Whelan, Knoxville, TN (US)

(73) Assignee: NAS Nalle Automation Systems, LLC, Knoxville, TN (US)

( * ) Notice: Subject to any disclaimer, the term of this patent is extended or adjusted under 35 U.S.C. 154(b) by 916 days.

(21) Appl. No.: 17/692,347

(22) Filed: Mar. 11, 2022

(65) Prior Publication Data

US 2023/0286240 A1 Sep. 14, 2023

(51) Int. Cl.
*B30B 15/30* (2006.01)
*B29C 51/44* (2006.01)
*B30B 15/32* (2006.01)
*B21D 43/04* (2006.01)

(52) U.S. Cl.
CPC ............ *B30B 15/30* (2013.01); *B29C 51/445* (2013.01); *B30B 15/32* (2013.01); *B21D 43/04* (2013.01)

(58) Field of Classification Search
CPC ....... B30B 15/30; B30B 15/32; B29C 51/445; B29C 2793/0009; B29C 2793/009; B21D 43/04; B26F 2001/4427; B65G 47/88; B65G 47/082; B65G 47/8815; B65G 47/8823
See application file for complete search history.

(56) References Cited

U.S. PATENT DOCUMENTS 5,336,043 A * 8/1994 Bader ................ B65G 47/8823
414/796

FOREIGN PATENT DOCUMENTS

EP 3620411 A1 * 3/2020 ............. B65B 65/02

* cited by examiner

*Primary Examiner* — Jimmy T Nguyen
(74) *Attorney, Agent, or Firm* — HOVEY WILLIAMS LLP

(57) ABSTRACT

A trim press receiver for receiving an array of products from a trim press includes support elements, a strip away mechanism, and a pusher rake. The support elements are configured to receive arrays of products and support the arrays of products in rows of stacks. The strip away mechanism is configured to form gaps in the stacks of products. The pusher rake is configured to extend into the gaps and press portions of the stacks off the support elements.

7 Claims, 21 Drawing Sheets

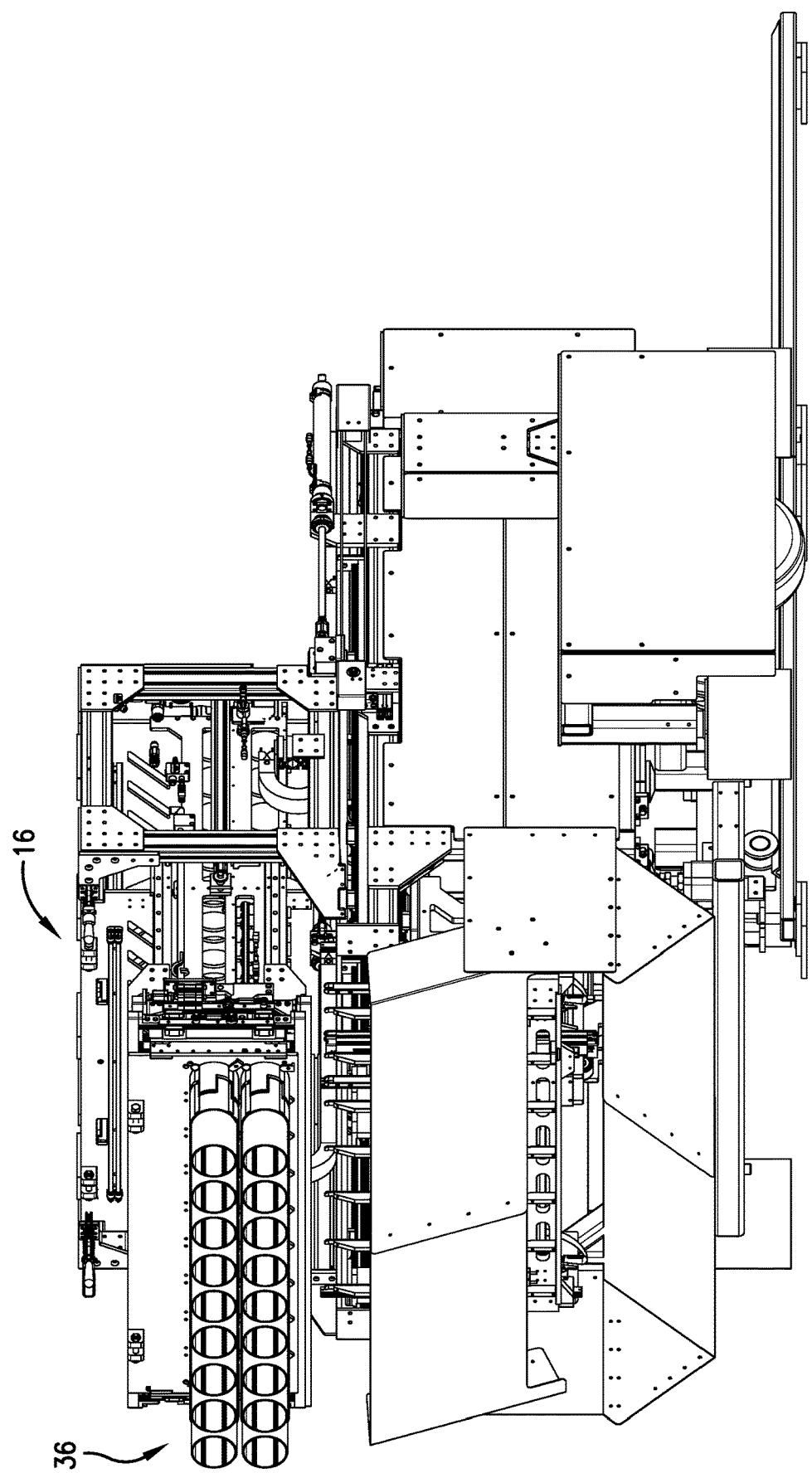

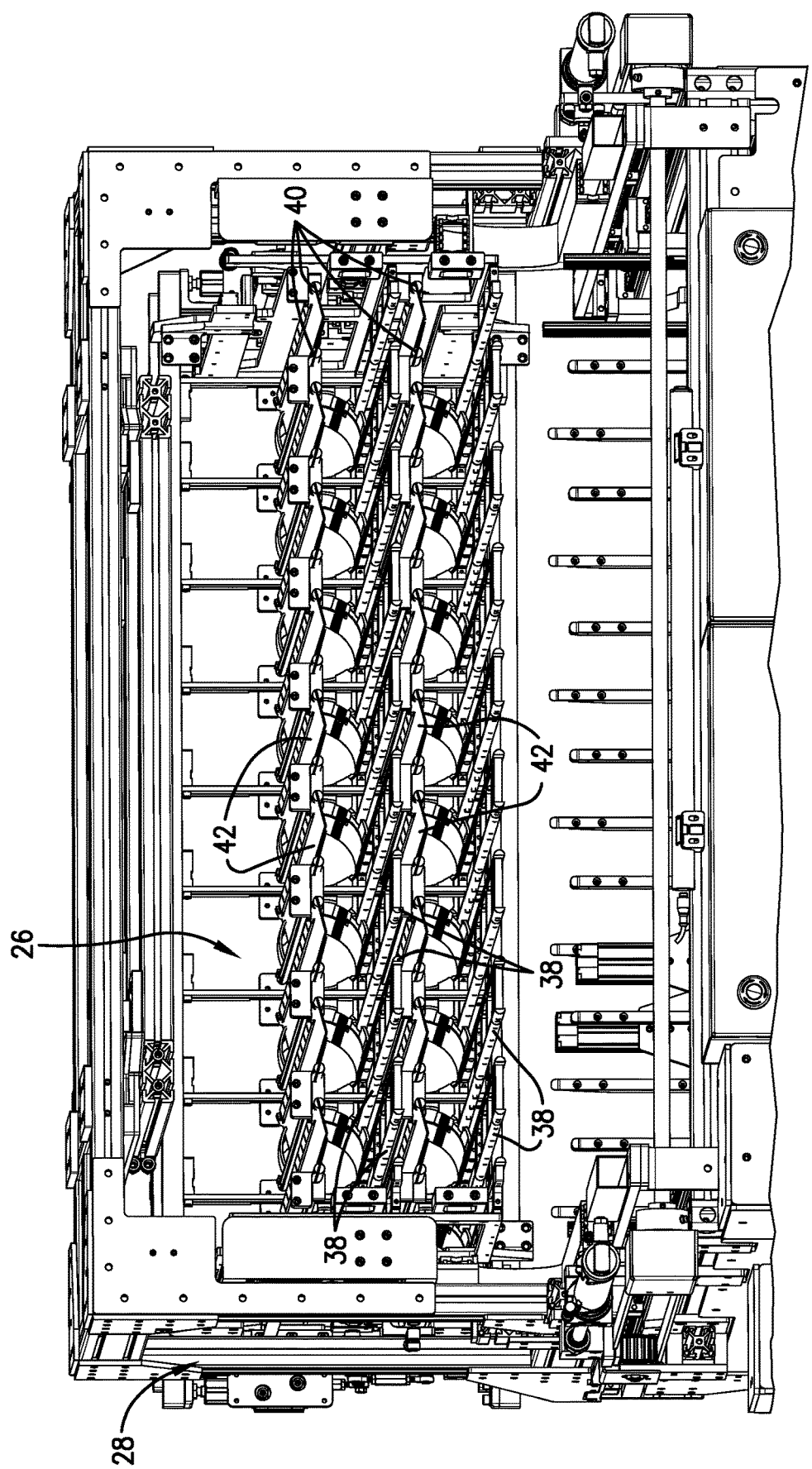

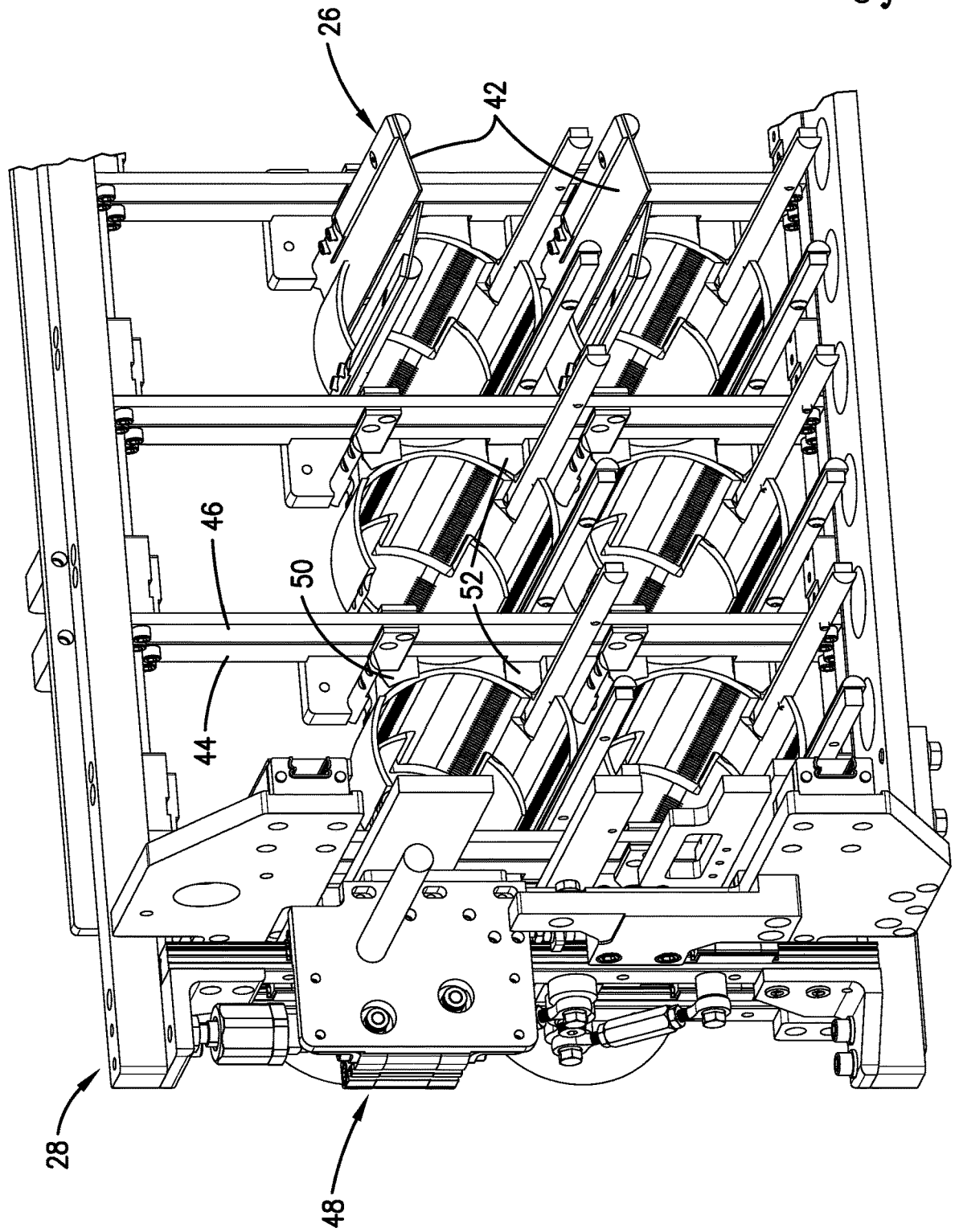

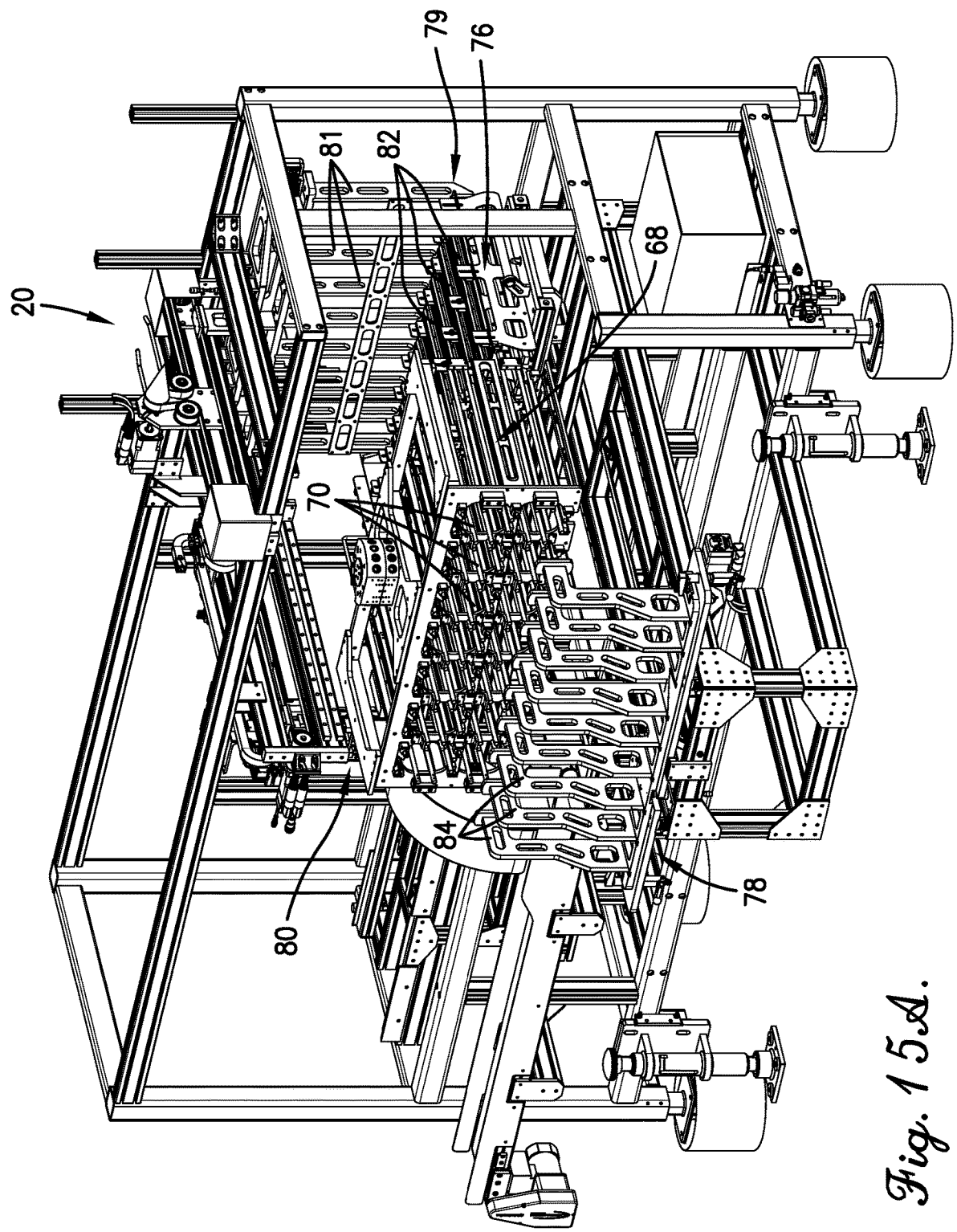

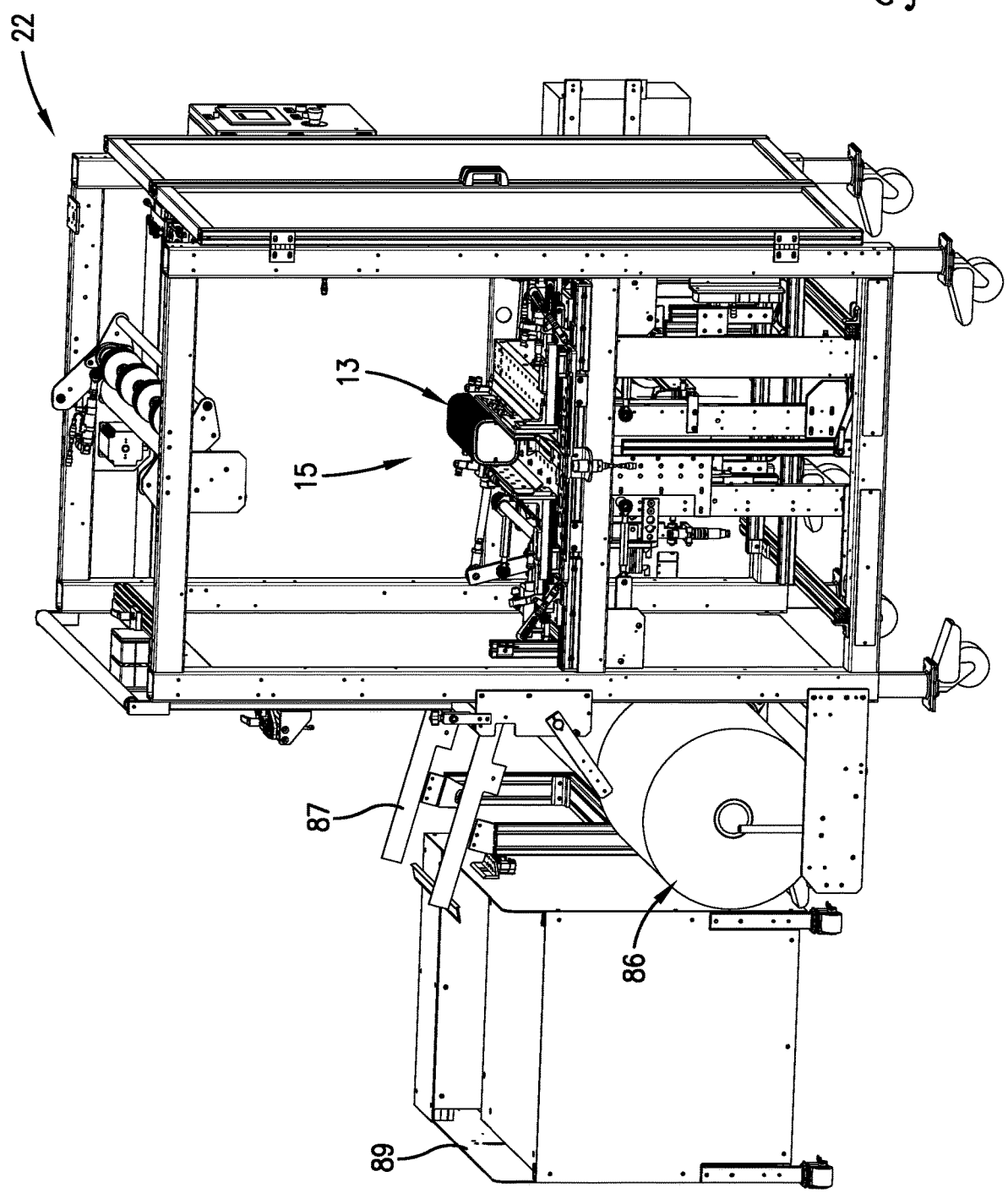

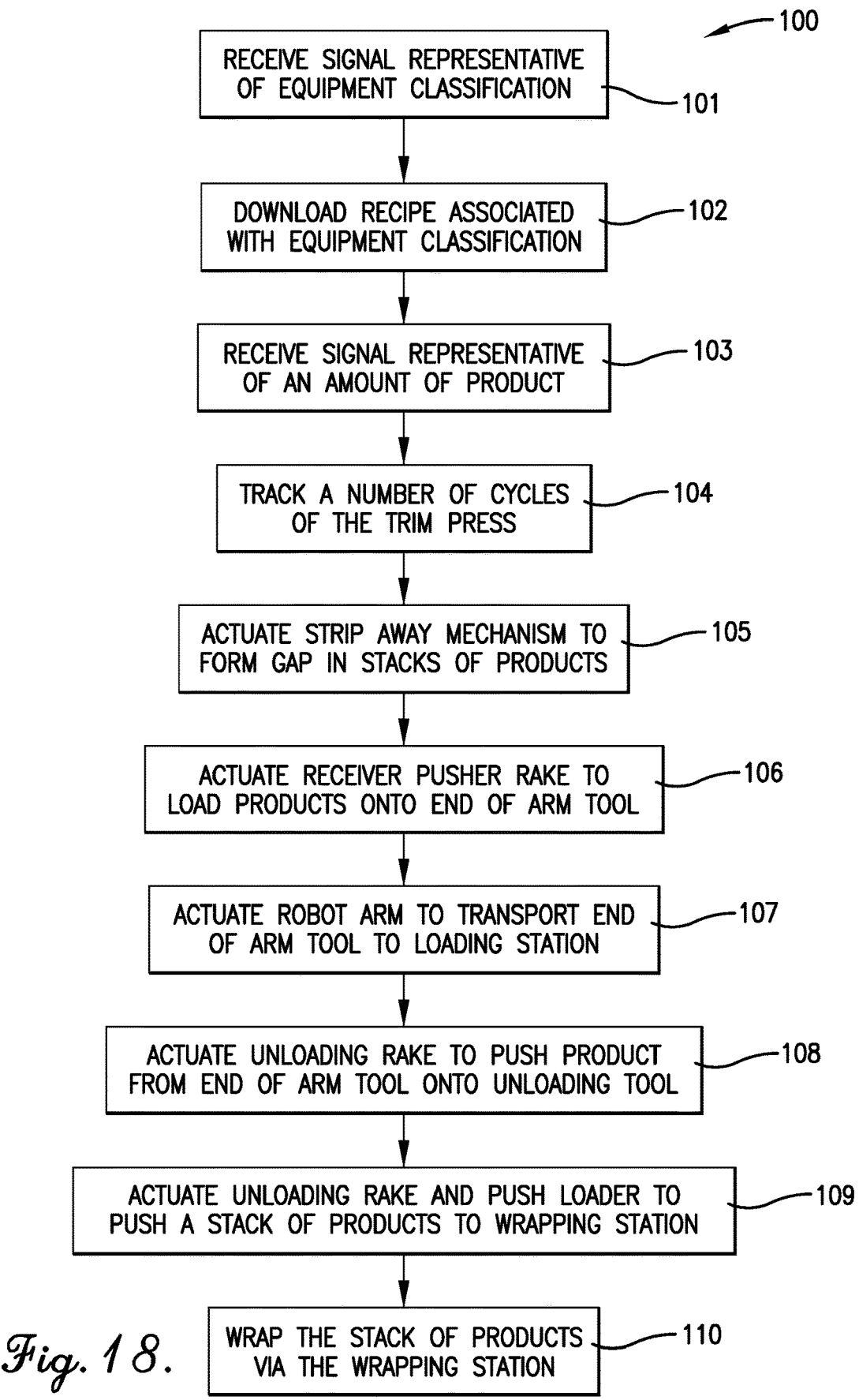

TRIM PRESS HANDLER SYSTEM

BACKGROUND

A trim press pushes products cut from a web through its trim die plate with a punch tool. A trim press receiver is operable to receive the products from the trim die plate so that the products form stacks on the trim press receiver. After a certain number of cycles, the stacks are removed from the trim press receiver. However, removing closely spaced products can be difficult. Current solutions for removing the products involve the trim press being configured to extend the punch tool a certain distance through the trim die plate to form a gap in the stacks of products on the trim press receiver. This enables a person or machine to pull the separated portions of the stacks off the trim press receiver. However, the cycle in which the punch extends into the plate to form the gaps is a longer cycle than a standard cutting cycle. The longer cycle reduces the speed and efficiency of the trim press. Further, when swapping out trim press dies for forming different sizes or types of products, the trim press and related equipment have to be reconfigured to account for the new equipment.

The background discussion is intended to provide information related to the present invention which is not necessarily prior art.

SUMMARY OF THE INVENTION

The present invention solves the above-described problems and other problems by providing systems and methods for receiving products that enable increased production rates, continuous operation of the trim press, and automated handling and wrapping of finished products.

A trim press receiver constructed according to an embodiment of the present invention comprises support elements, a strip away mechanism, and a pusher rake. The support elements are configured to receive arrays of products and support the arrays of products in rows of stacks. The strip away mechanism is configured to form gaps in the stacks of products. The pusher rake is configured to extend into the gaps and press portions of the stacks off the support elements.

A computer-implemented method of configuring a robotic arm according to an embodiment of the present invention broadly comprises connecting to a memory element attached to an end of arm tool coupled to the robotic arm; retrieving, from the memory element via a processing element, a recipe associated with the end of arm tool, the recipe comprising at least one of a pick position associated with the end of arm tool, a retraction path associated with the end of arm tool, a speed of part handling associated with the end of arm tool, or a placement position associated with the end of arm tool; and adjusting, via the processing element, a parameter of the robotic arm based at least in part on the recipe.

An automated system for wrapping products formed at a trim press according to an embodiment of the present invention broadly comprises a trim press receiver, a robotic arm, a loading station, and a wrapping station. The trim press receiver is configured to receive arrays of the products from the trim press and comprises support elements, a strip away mechanism, and a pusher rake. The support elements are configured to support the arrays of products in rows of stacks. The strip away mechanism is configured to form gaps in the stacks. The pusher rake is configured to extend into the gaps and press portions of the stacks off of the support elements.

The robotic arm is operable to actuate about a plurality of axes and includes an end of arm tool. The end of arm tool comprises tool support elements that align with the support elements of the trim press receiver when the robotic arm actuates to place the end of arm tool adjacent to the support elements. The tool support elements receive the portions of the stacks pushed thereon by the pusher rake. The loading station is configured to receive the stacks of products from the end of arm tool and output the products in a row for wrapping. The wrapping station is configured to receive the row and wrap the row in material.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 3 is a perspective view of a front end of the trim press receiver of FIG. 2;

FIG. 4 is a perspective view of a portion of a rear end of the trim press receiver of FIG. 2;

FIG. 5A is an enlarged view of support elements of the trim press receiver of FIG. 2;

FIG. 15A is a perspective view of the loading station of FIG. 14;

FIG. 16 is a perspective view of a wrapping station of the trim press handler system of FIG. 1;

FIG. 18 is a flowchart depicting exemplary steps of a method according to an embodiment of the present invention.

Figure 1:
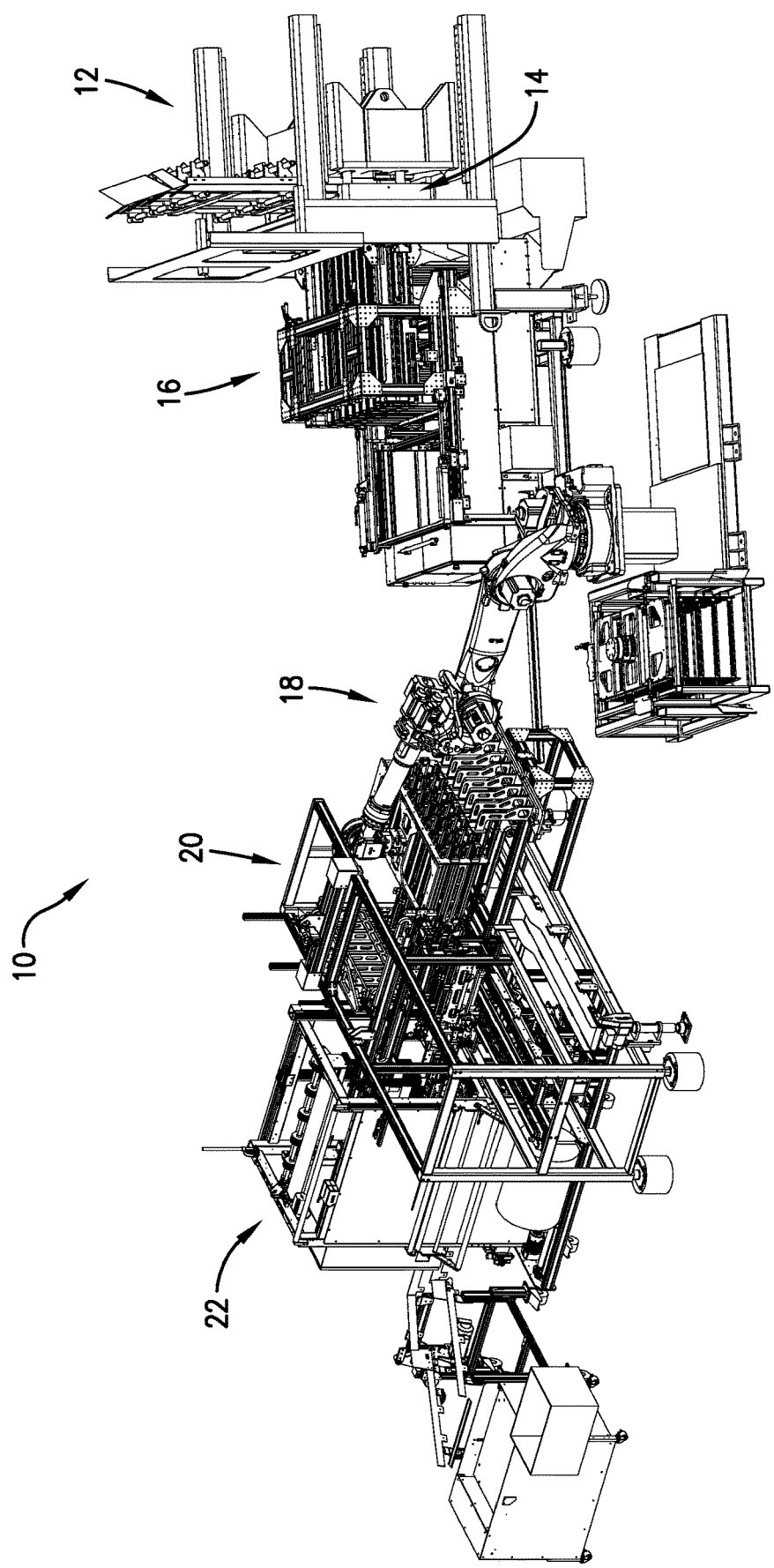
FIG. 1 is a perspective view of a trim press handler system constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, a trim press handler system 10 constructed in accordance with an embodiment of the invention is illustrated. The system 10 is configured to receive products from a trim press 12 and wrap predetermined amounts of the products. The products may include lids, plates, bowls, trays, or the like. The products may be made of paper, plastic, polystyrene, recycled paper, vegetable or organic matter, cotton, bamboo, or the like. The trim press 12 may be configured to output the products in arrays through its die plate 14. The die plate 14 may include any number of holes through which the trimmed product is pushed through without departing from the scope of the present invention. The holes may also be in any configuration without departing from the scope of the present invention. For example, the holes of the die plate 14 may be arranged in one or more rows and one or more columns. The system 10 receives the products through the holes and comprises a trim press receiver 16, a robotic arm 18, a loading station 20, a wrapping station 22, and a control system 24 (depicted schematically in FIG. 17).

Figure 2:
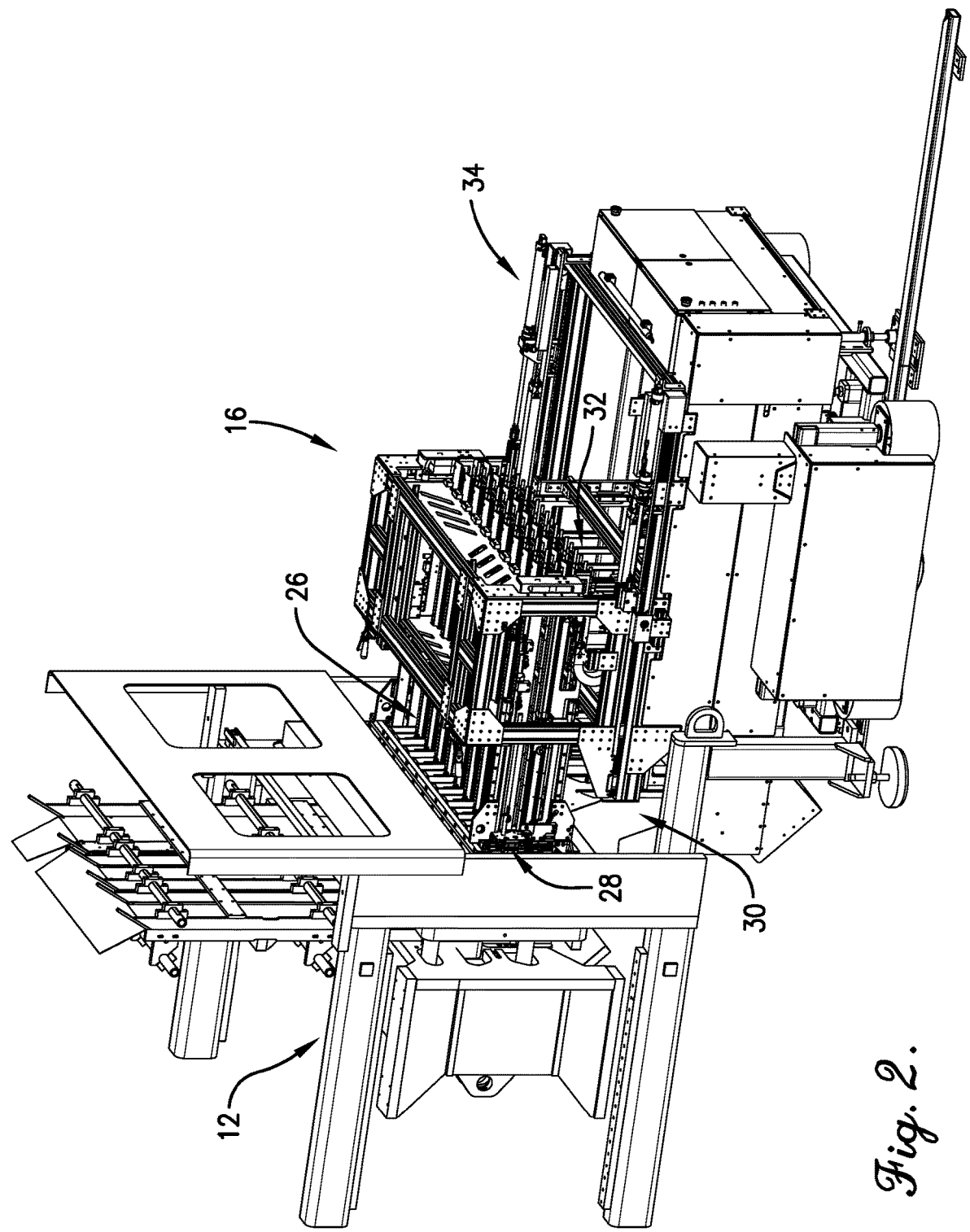
FIG. 2 is a perspective view of a trim press receiver of the system of FIG. 1.

Turning to FIG. 2, the trim press receiver 16 is configured to receive the arrays of the products from the trim press 12 and temporarily store them in stacks. The trim press receiver 16 comprises a plurality of support elements 26, a strip away mechanism 28, a pusher rake 30, and a leading rake 32. The support elements 26 are configured to support the arrays of products in rows of stacks and extend from the trim press 12 to a rear region 34 where an end of arm tool (discussed in further detail below) of the robotic arm can be placed in alignment with the support elements 26. As shown in FIG. 3, the support elements of the trim press receiver 16 may include sleeves 36 operable to abut holes of the trim press and receive the products. Turning to FIG. 4, the support elements 26 may include one or more rows of bottom support rods 38 and corresponding upper support rods 40 having flexible fins 42. The bottom support rods 38 slidably support the bottom portions of the products, and the fins 42 secure the products in upright stacked positions as the trim press pumps the products onto the support elements 26. The fins 42 may be made of rubber, bristles, or the like.

Figure 5B:
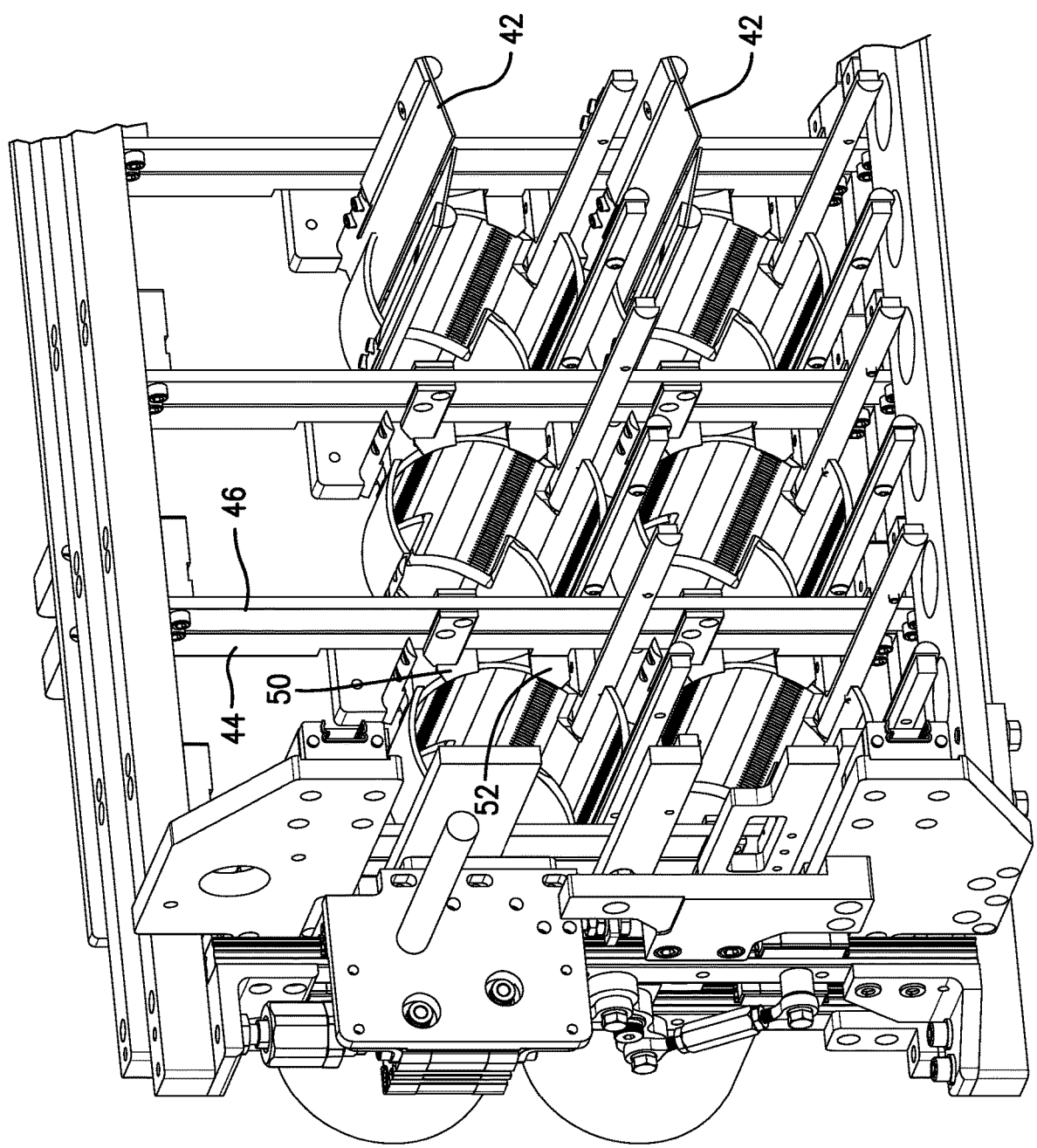
FIG. 5B is an enlarged view of the support elements of FIG. 2 with rods of a strip away mechanism actuated.
Figure 6A:
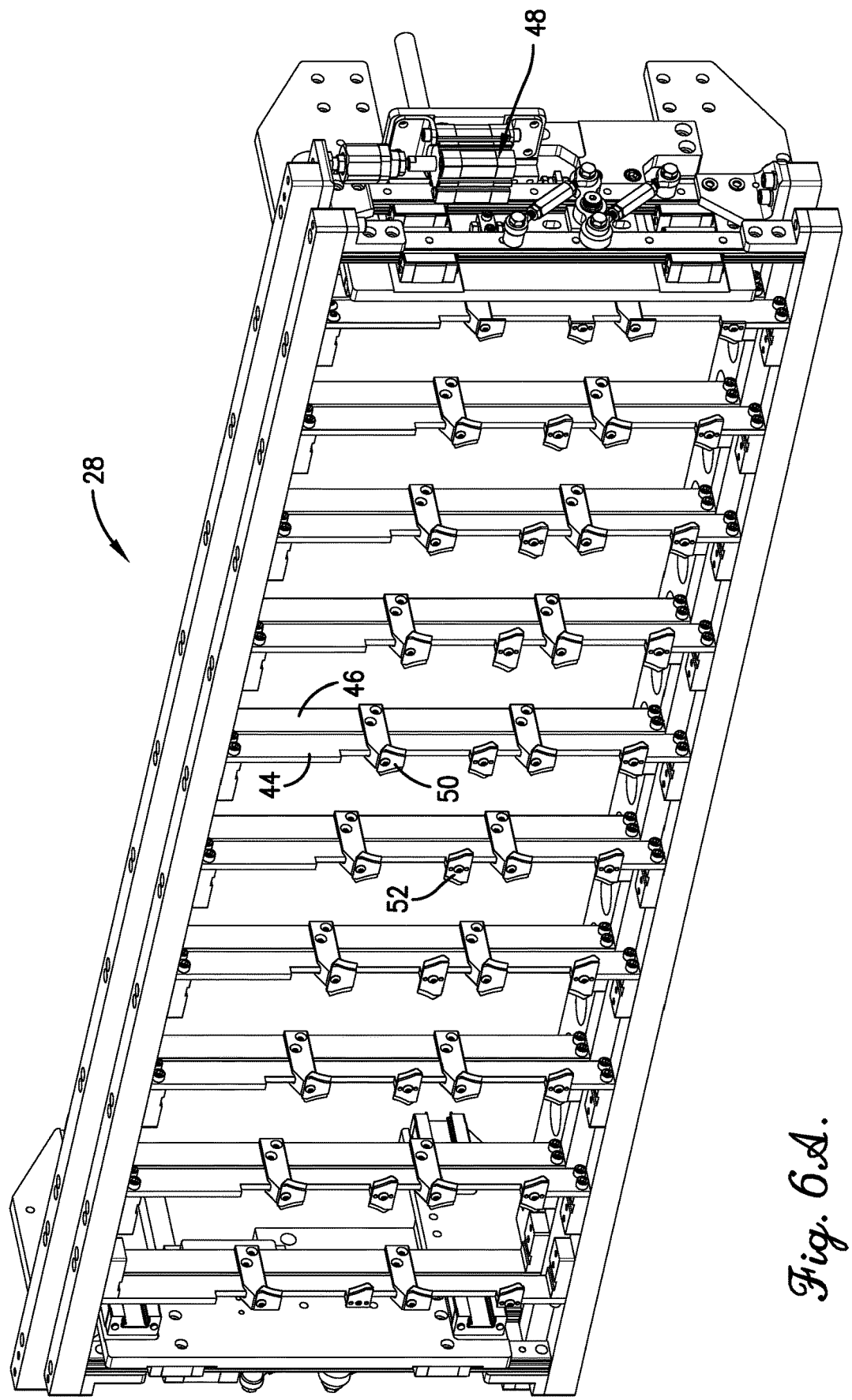
FIG. 6A is a perspective view of the strip away mechanism of FIG. 5A.
Figure 6B:
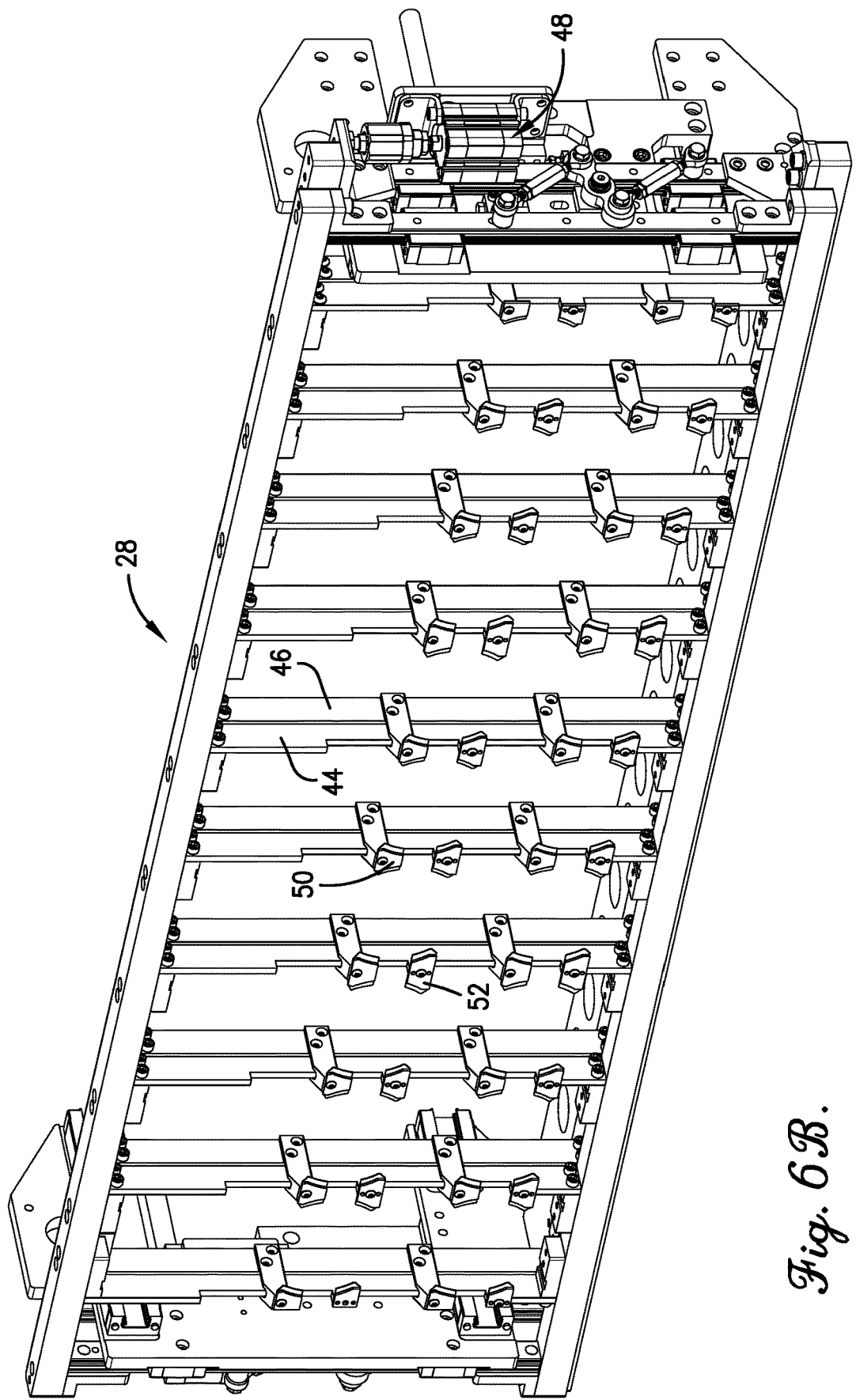
FIG. 6B is a perspective view of the rods of the strip away mechanism actuated as in FIG. 5B.

Turning to FIG. 5A, the strip away mechanism 28 is configured to engage the stacks of products and form gaps therein. The strip away mechanism 28 may include a plurality of rods 44, 46 extending between the support elements 26 and a actuator 48. The rods 44, 46 are vertically shiftable relative to one another so that they shift transversely relative to the longitudinal lengths of the support elements 26. The actuator 48 is configured to shift the rods 44, 46 relative to one another, and the rods 44, 46 include tabs 50, 52 that engage the products. The actuator 48 may comprise any type of actuator without departing from the scope of the present invention. For example, the actuator 48 may comprise a pneumatic actuator, a hydraulic actuator, or servomotor. In preferred embodiments, the actuator 48 comprises a pneumatic actuator. FIG. 5A depicts the rods 44, 46 and the tabs 50, 52 in a first position in which products would not be engaged. FIG. 5B depicts the rods 44, 46 and the tabs 50, 52 in a second position in which the products would be engaged. The tabs 50 connected to back rods 46 shift downward, and the tabs 52 connected to front rods 44 shift upward. FIG. 6A depicts the rods 44, 46 and tabs 50, 52 of the strip away mechanism 28 at the first position. FIG. 6B depicts the rods 44, 46 and the tabs 50, 52 of the strip away mechanism 28 at the second position in which the tabs 50, 52 engage the products.

Figure 7:
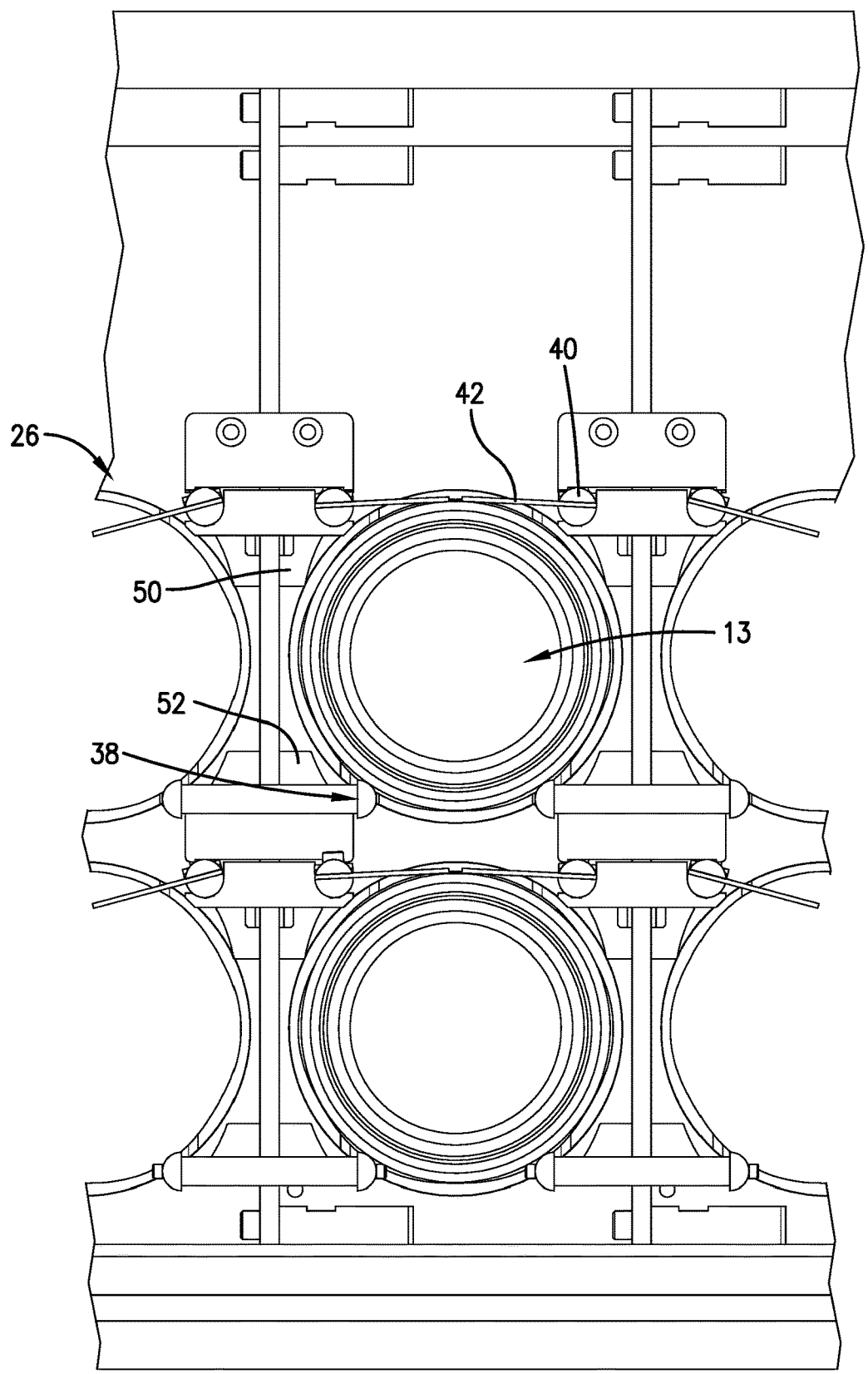
FIG. 7 is a perspective view of the strip away mechanism as in FIG. 6A with product on the support elements.
Figure 8:
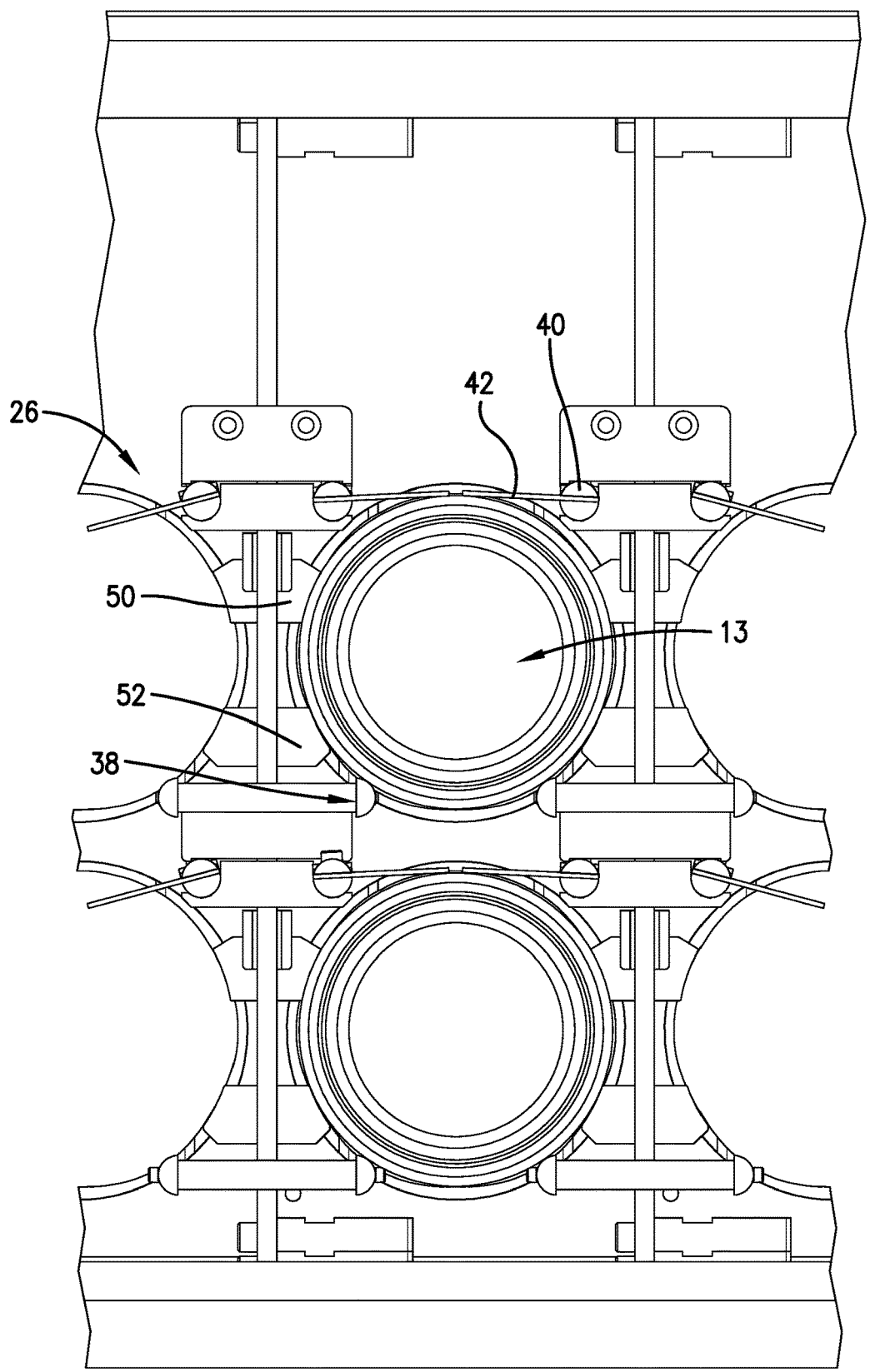
FIG. 8 is a perspective view of the strip away mechanism as in FIG. 6B engaging the products.

Turning to FIG. 7, exemplary products 13 are secured on the support elements 26 via the fins 42 of the upper support rods 40 and resting on the bottom support rods 38. The tabs 50, 52 are in the first position in which the products 13 are not engaged. Turning to FIG. 8, the rods and their corresponding tabs 50, 52 are shifted to engage the products 13.

Figure 9:
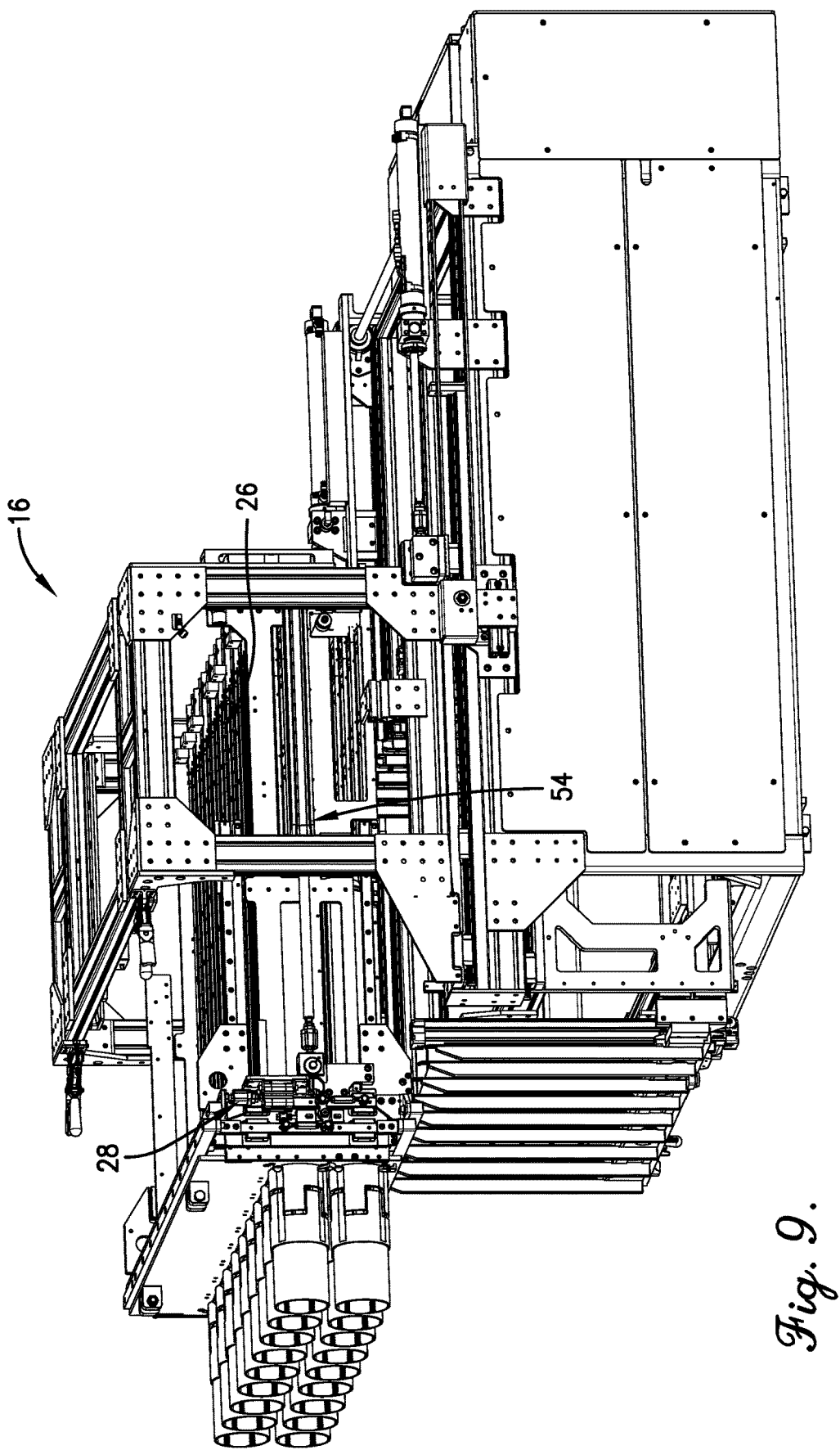
FIG. 9 is a side perspective view of the strip away mechanism as in FIG. 8 at a first position.
Figure 10:
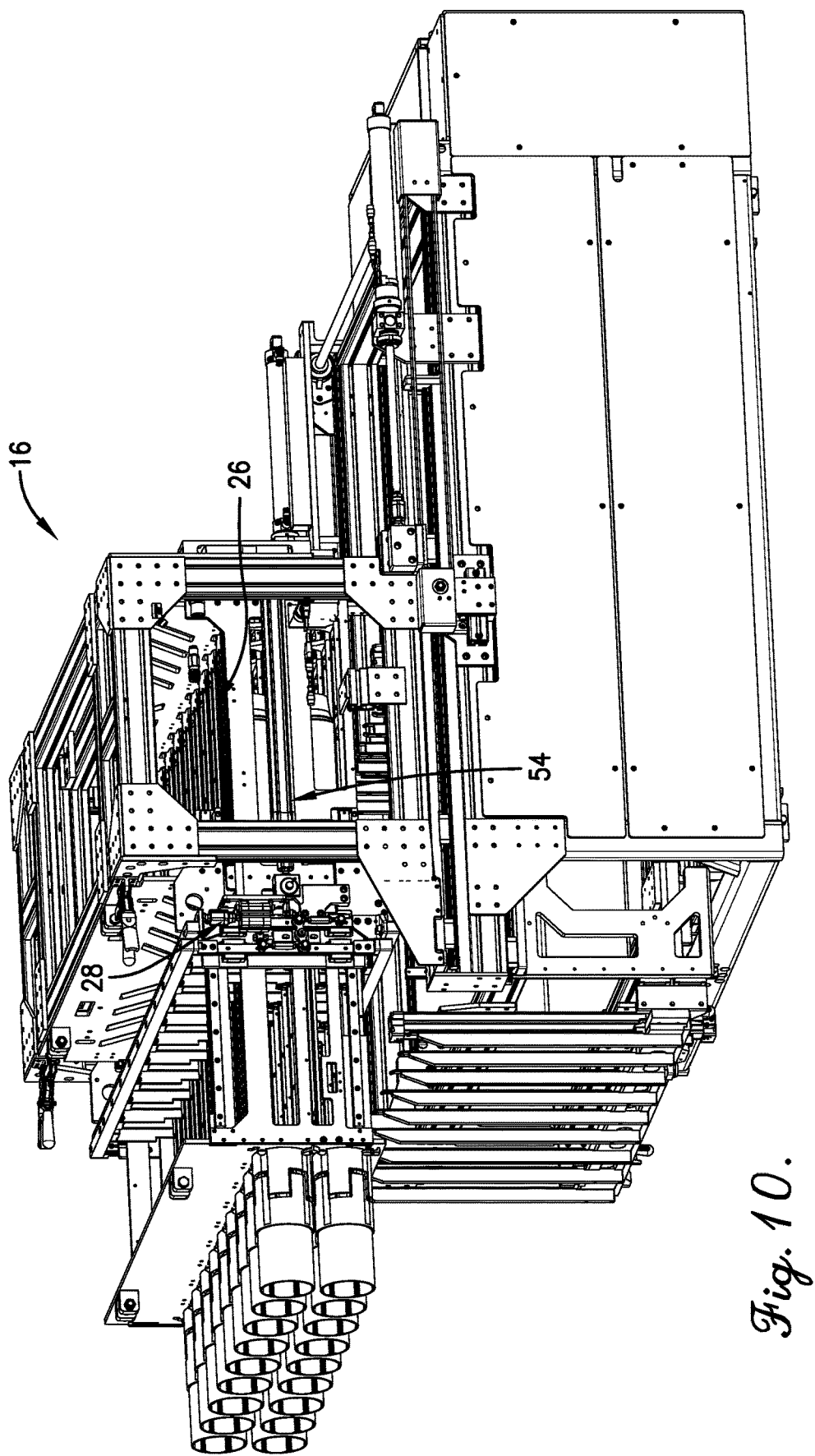
FIG. 10 is a side perspective view of the strip away mechanism as in FIG. 8 at a second position.

Turning to FIG. 9, when the strip away mechanism 28 engages the products on the support elements 26, the strip away mechanism 28 is configured to shift along the longitudinal lengths of the support elements 26 to form a gap in the stacks of products. The trim press receiver 16 may include a actuator 54 configured to shift the strip away mechanism 28 horizontally along the longitudinal lengths of the support elements 26. FIG. 10 depicts the strip away mechanism 28 shifted to a second position along the longitudinal lengths of the support elements 26, thereby forming long, controlled gaps in the stacks of products on the support elements 26. By using the strip away mechanism 28 to form such gaps in the stacks, the trim press is not required to extend past its die plates to form the gaps. This enables the trim press to operate continuously, which improves the efficiency and speed of production. This also enables the automation of a trim press with no eject capabilities or disabled eject capabilities.

Figure 11:
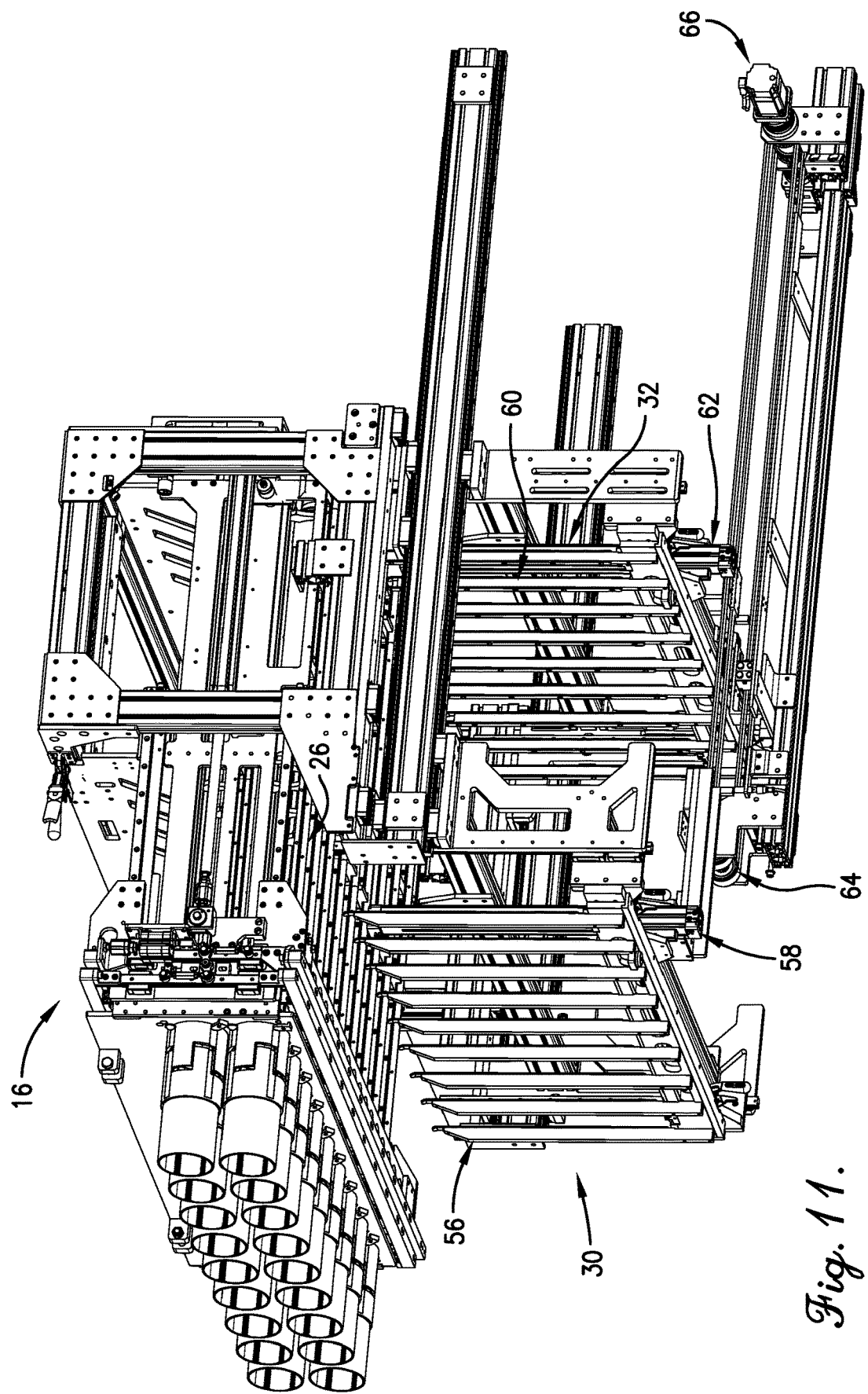
FIG. 11 is a lowered perspective view of the trim press receiver of FIG. 2 with a pusher rake and leading rake at a first position.
Figure 12:
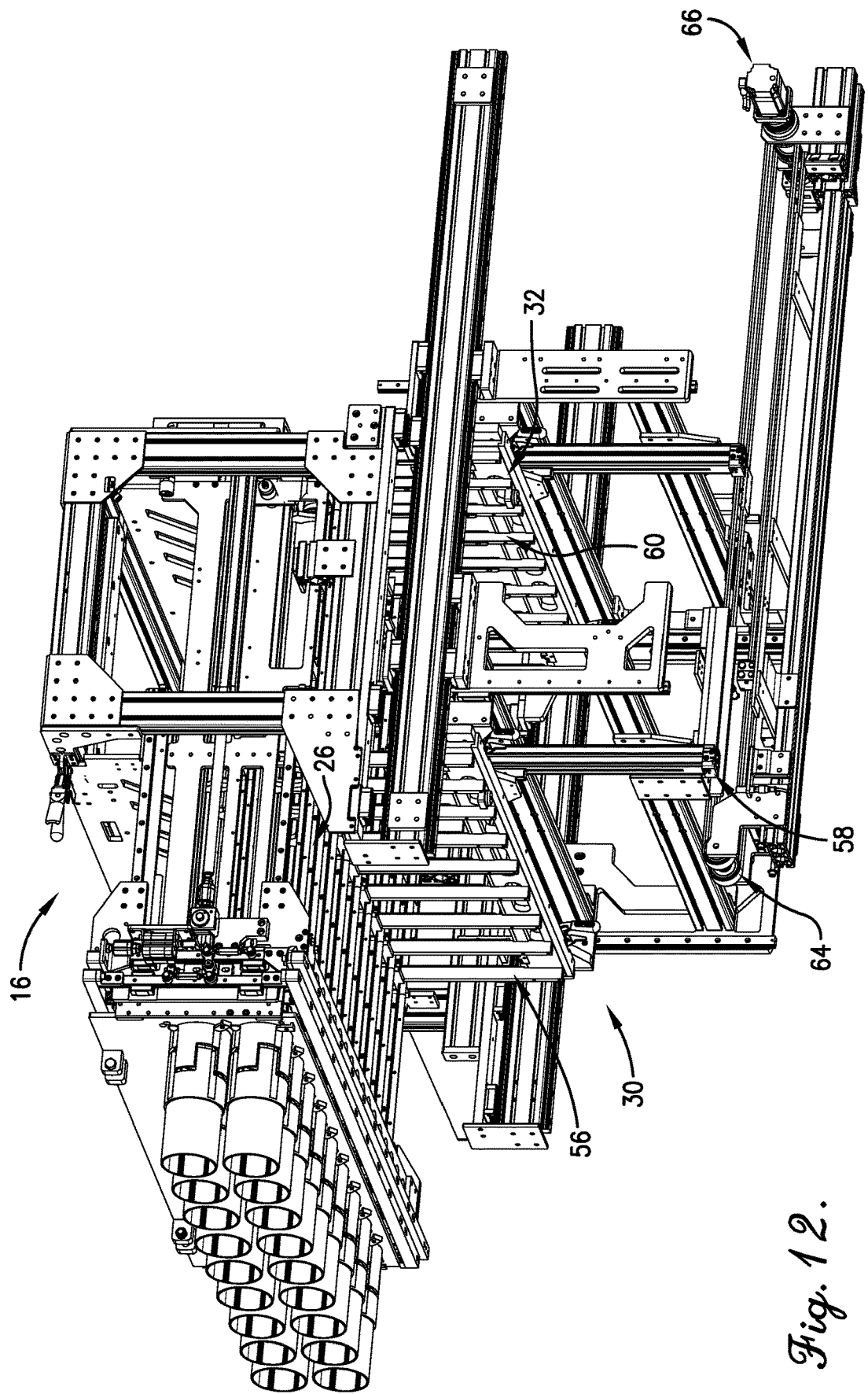
FIG. 12 is a lowered perspective view of the trim press receiver of FIG. 2 with the pusher rake and the leading rake at a second position.
Figure 13:
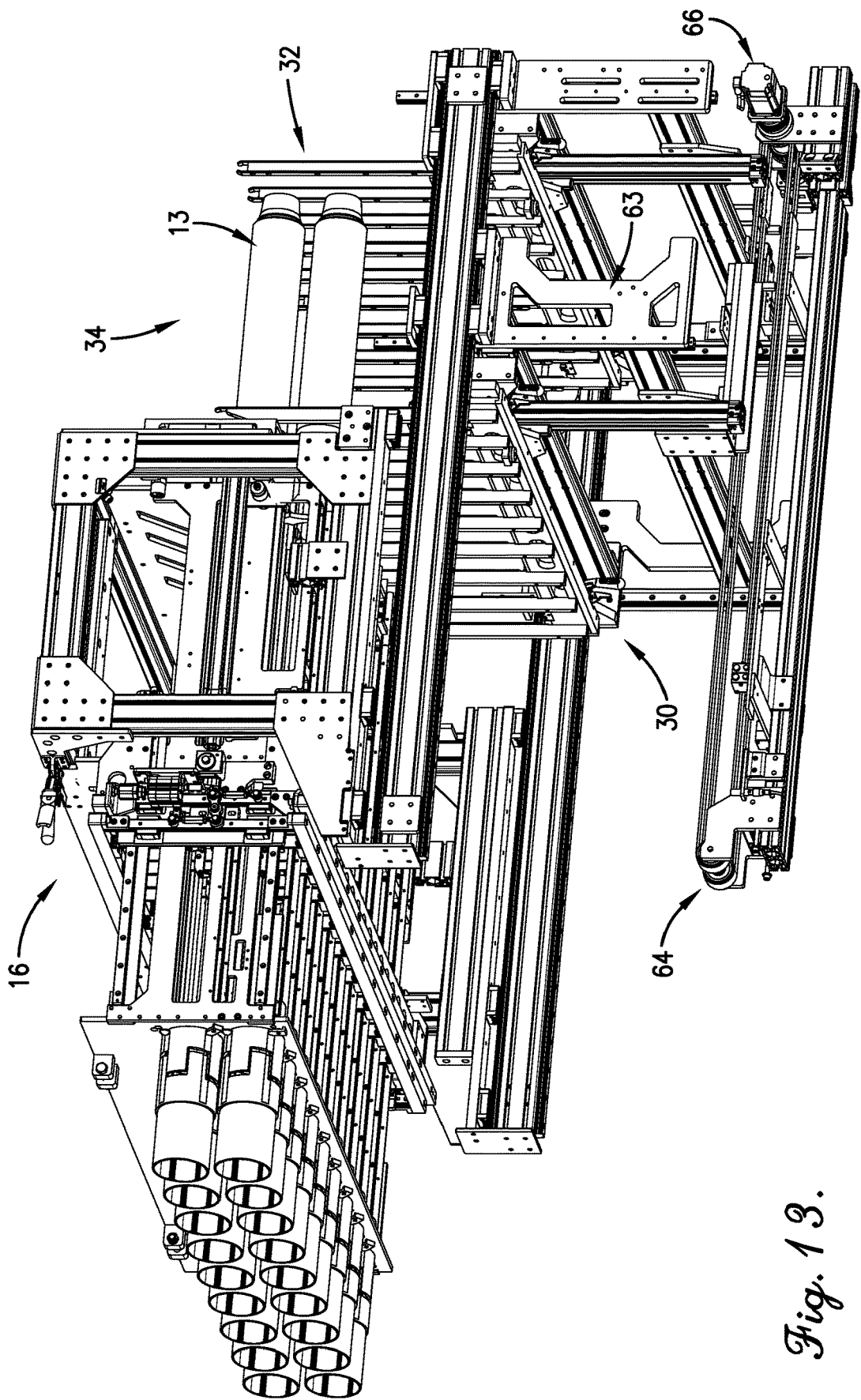
FIG. 13 is a lowered perspective view of the trim press receiver of FIG. 2 with the pusher rake and the leading rake at a third position.

Turning to FIG. 11, the pusher rake 30 is configured to extend into the gaps in the stacks of products on the support elements 26 and press portions of the stacks off of the support elements 26. The pusher rake 30 may comprise a plurality of tines 56 that shift vertically into the support elements 26 and one or more actuator 58 that drives the vertical shifting of the tines 56. The actuator 58 may comprise any type of actuator without departing from the scope of the present invention. For example, the actuator 58 may comprise a pneumatic actuator, a hydraulic actuator, or servomotor. In preferred embodiments, the actuator 58 comprises a pneumatic actuator. The leading rake 32 is configured to compress the portions of the stacks of products as the pusher rake 30 pushes the portions of the stacks off the support elements 26. The leading rake 32 may also include a plurality of vertically shiftable tines 60 and one or more actuator 62 that drives the vertical shifting of the tines 60. The actuator 62 may comprise any type of actuator without departing from the scope of the present invention. For example, the actuator 62 may comprise a pneumatic actuator, a hydraulic actuator, or servomotor. In preferred embodiments, the actuator 62 comprises a pneumatic actuator. FIG. 12 depicts the tines 56, 60 of the pusher and leading rakes 30, 32 in their vertically shifted positions. The tines 56 of the pusher rake 30 extend into the gaps in the stacks of products. FIG. 13 depicts the pusher and leading rakes 30, 32 horizontally shifted to the rear region 34 of the trim press receiver 16 holding portions of the stacks of products 13. In use, the end of arm tool (discussed in further detail below) would be positioned in the rear region 34 to receive the stacks of products 13. The trim press receiver 16 may include a horizontally-shiftable chassis 63 that may be connected to a belt and pulley system 64 that is driven by one or more actuator 66. The chassis 63 supports the pusher and leading rakes 30, 32 and shifts them horizontally to push the portions of the stacks of products 13 onto the end of arm tool. The present embodiment comprises a plurality of servomotors to actuate various components, but any type of actuator may be used without departing from the scope of the present invention.

Figure 14:
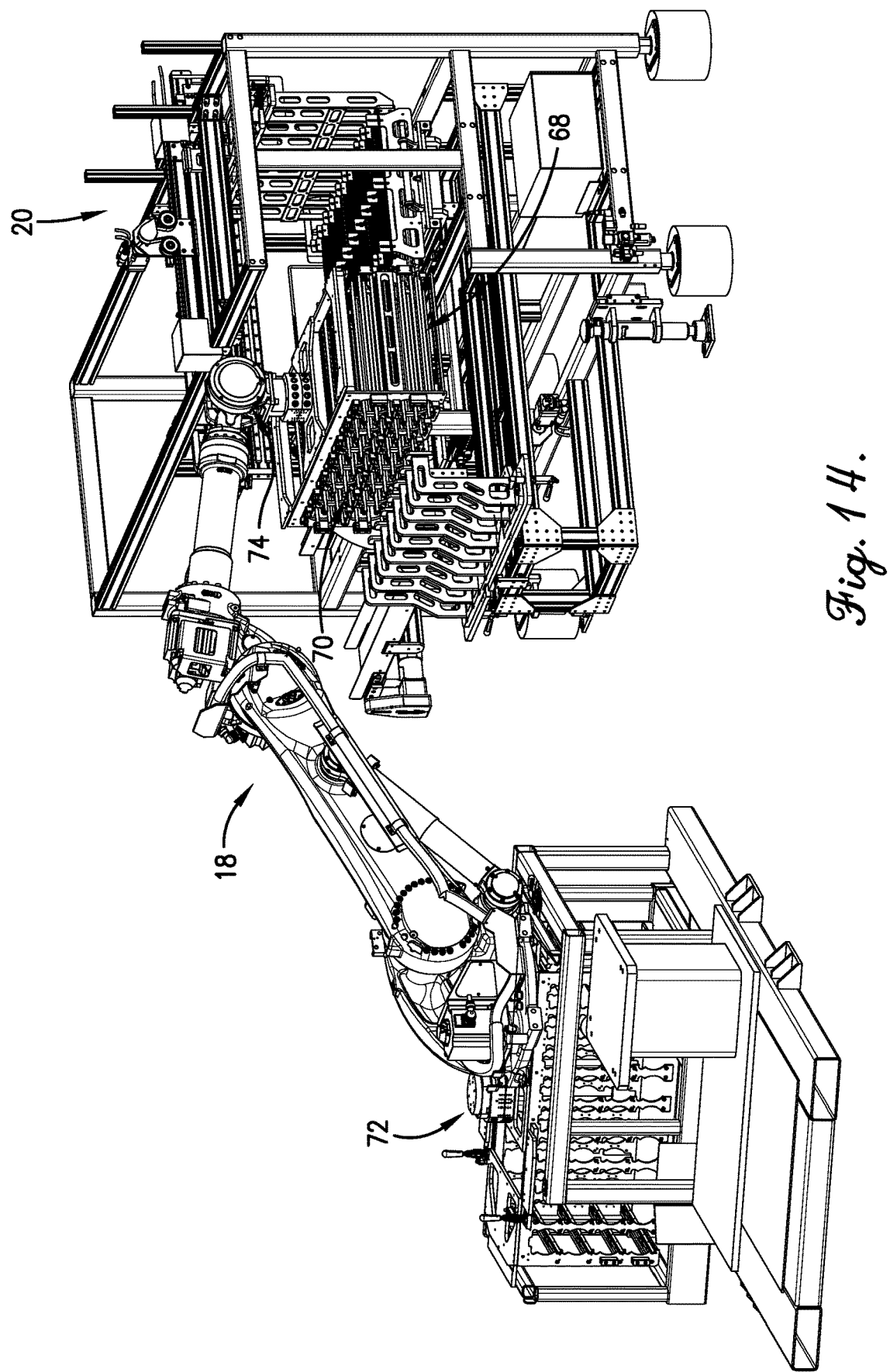
FIG. 14 is a perspective view of a robot arm and loading station of the trim press handler system of FIG. 1.

Turning to FIG. 14, the robotic arm 18 is operable to actuate about a plurality of axes and includes an end of arm tool 68. The robotic arm 18 may include a plurality of actuators, such as pneumatic actuators, hydraulic actuators, servomotors, or the like for actuating about the plurality of axes. The end of arm tool 68 comprises tool support elements 70 that align with the support elements of the trim press receiver when the robotic arm 18 actuates to place the end of arm tool 68 adjacent to the support elements of the trim press receiver. The tool support elements 70 receive the portions of the stacks of products pushed thereon by the pusher rake of the trim press receiver. The robotic arm 18 is configured to shift the end of arm tool 68 from the trim press receiver to the loading station 20 for unloading the portions of the stacks onto the loading station 20.

In some embodiments, the robotic arm 18 is configured to couple to the end of arm tool 68 and to decouple from the end of arm tool 68. The robotic arm 18 may be configured to couple to a different end of arm tool 72 when it detects a change in equipment and/or is directed to by the control system 24. The end of arm tool 72 may be equipped with a memory element 74 configured to store a recipe (as discussed in further detail below). The robotic arm 18 may be configured to receive the recipe from the memory element 74 and send the recipe to the control system 24.

In some embodiments, the system 10 may include a scanning device 75 (depicted in FIG. 17), such as a bar code scanner, a QR code scanner, a camera, an RFID chip reader, or the like, and the trim press receiver, end of arm tool 68, trim press, and/or loading station 20 may have thereon a bar code, QR code, text code, RFID chip, or the like. The scanning device 75 may be configured to send the scanned data from the scanning device 75 to the control system 24. By using a robotic arm 18 in conjunction with the loading station 20 and trim press receiver 16, the system 10 can be installed and implemented in any number of floor spaces.

Turning to FIG. 15A, the loading station 20 is configured to receive the stacks of products from the end of arm tool 68 and output the products in a row for wrapping. The loading station 20 may include a horizontally shiftable unloading tool 76, an unloading rake 78, a leading rake 79, and a push loader 80. The loading station 20 may further comprise a plurality of actuators (not shown), such as pneumatic actuators, hydraulic actuators, servomotors, or the like, to actuate the unloading tool 76, unloading rake 78, leading rake 79, and push loader 80.

Figure 15B:
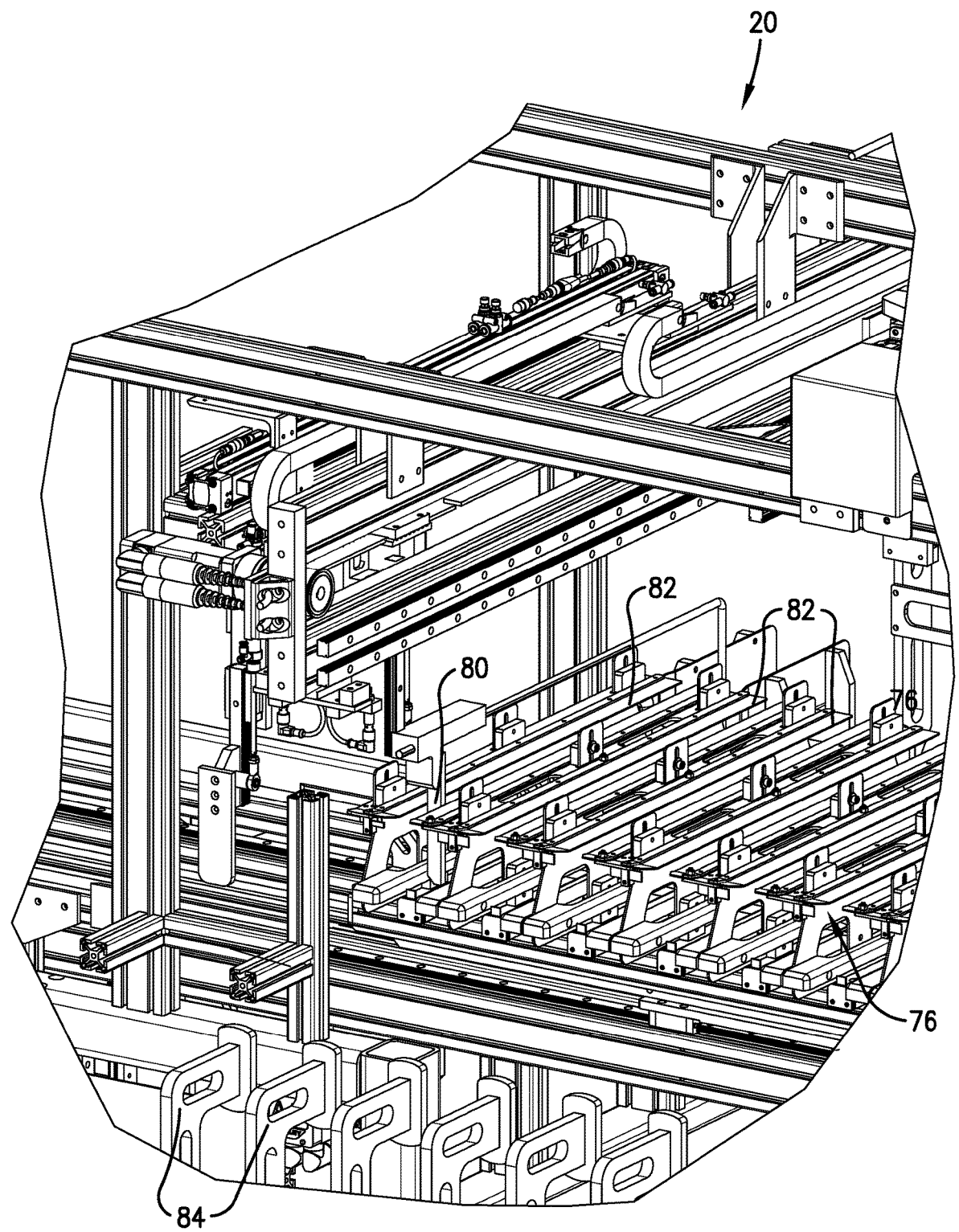
FIG. 15B is a fragmentary view of the loading station of FIG. 14 showing a push loader of the loading station.

The unloading tool 76 includes a plurality of unloading support elements 82 arranged to receive the portions of the stacks of products from the end of arm tool 68. The support elements 70 of the end of arm tool 68 are arranged to line up with the unloading support elements 82. The loading tool 76 may be configured to receive one of the rows of stacks from the end of arm tool 68 and then shift horizontally so that each stack of products can be individually pushed to the wrapping station by the push loader 80. The unloading rake 78 may be configured to actuate toward the unloading tool 76 and include tines 84 that push the stacks of products onto the unloading tool 76. The unloading rake 78 may be configured to push one row of stacks of products into the unloading tool 76 at a time. The leading rake 79 includes a plurality of tines 81 configured to apply positive pressure to the row of stacks of products as they are unloaded onto the unloading tool 76. Turning to FIG. 15B, the push loader 80 is configured to shift transversely to the movement of the unloading tool 76 to push each of the stacks of products to the wrapping station.

Turning to FIG. 16, the wrapping station 22 is configured to receive the row 15 of products 13 and wrap the row 15 in material 86. The material 86 may be made of paper, plastic, or the like. Once the row 15 of products 13 is wrapped, the wrapping station 22 may be configured push the wrapped row 15 onto a conveyor 87 and/or into a storage/transportation bin 89.

Figure 17:
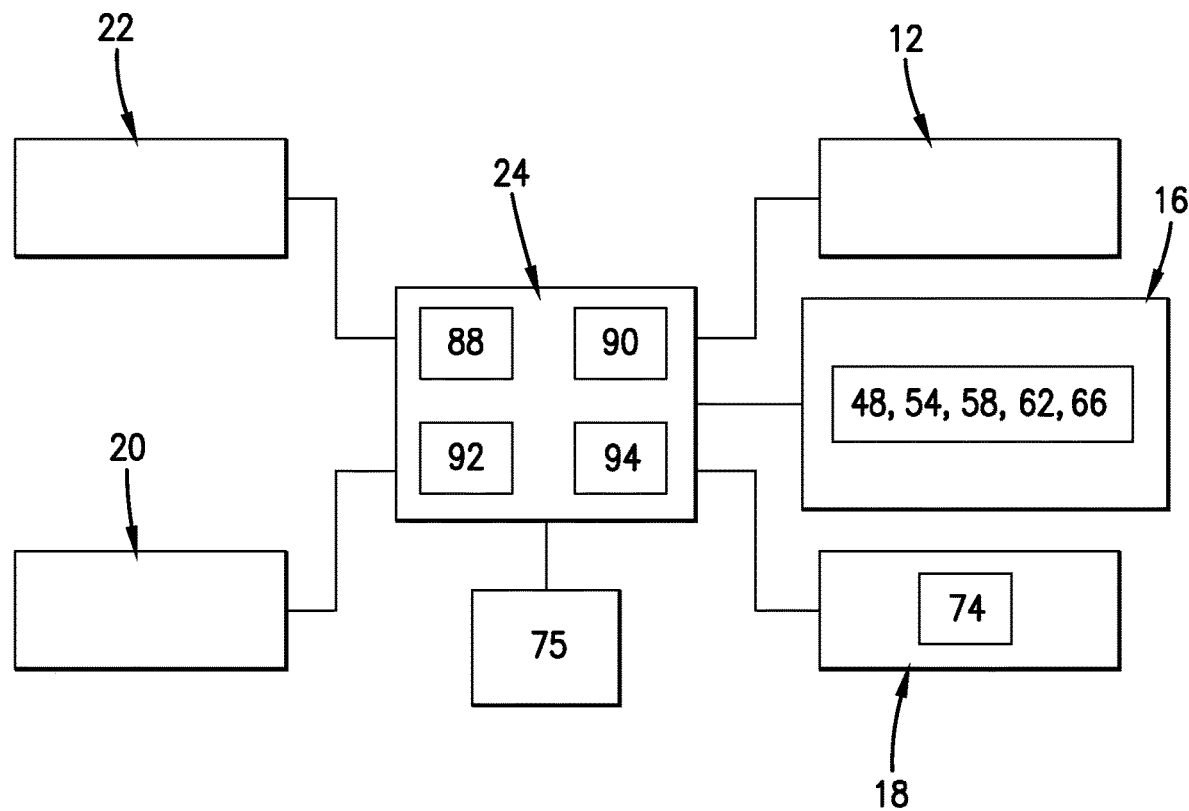
FIG. 17 is a block diagram depicting selected components of the system of FIG. 1.

Turning to FIG. 17, various components of the system 10 may be controlled by and/or in communication with the control system 24. The control system 24 may comprise a communication element 88, a memory element 90, a user interface 92, and a processing element 94. The communication element 88 may generally allow communication with systems or devices external to the system 10. The communication element 88 may include signal or data transmitting and receiving circuits, such as antennas, amplifiers, filters, mixers, oscillators, digital signal processors (DSPs), and the like. The communication element 88 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 88 may be in communication with the processing element 94 and the memory element 90.

The memory element 90 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 90 may be embedded in, or packaged in the same package as, the processing element 94. The memory element 90 may include, or may constitute, a "computer-readable medium". The memory element 90 may store the instructions, code, code segments, software, firmware, programs, applications, apps, services, daemons, or the like that are executed by the processing element 94.

The user interface 92 generally allows the user to utilize inputs and outputs to interact with the system 10 and is in communication with the processing element 94. Inputs may include buttons, pushbuttons, knobs, jog dials, shuttle dials, directional pads, multidirectional buttons, switches, keypads, keyboards, mice, joysticks, microphones, or the like, or combinations thereof. The outputs of the present invention include a display but may include any number of additional outputs, such as audio speakers, lights, dials, meters, printers, or the like, or combinations thereof, without departing from the scope of the present invention.

The processing element 94 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 94 may generally execute, process, or run instructions, code, code segments, software, firmware, programs, applications, apps, processes, services, daemons, or the like. The processing element 94 may also include hardware components such as finite-state machines, sequential and combinational logic, and other electronic circuits that can perform the functions necessary for the operation of the current invention. The processing element 94 may be in communication with the other electronic components through serial or parallel links that include address buses, data buses, control lines, and the like.

For example, the processing element 94 of the control system 24 may be in communication with the trim press 12, the trim press receiver 16 (and its actuators 48, 54, 58, 62, 66), the robotic arm 18, the unloading station 20, the wrapping station 22, and/or other components or sensors. The processing element 94 may be in communication with the above components via the communication element 88 and/or direct wiring. The processing element 94 may be configured to send and/or receive information to and/or from the above components. The processing element 94 may also be configured to send and/or receive commands to and/or from the above components.

The processing element 94 may be configured to direct the robotic arm 18 to scan, via the scanning device 75, the loading station 20, the trim press receiver 16, and/or the end of arm tool and receive scanning data from the scanning device 75. The processing element 94 may be configured to retrieve recipe data from the memory element 90 based at least in part on the scanning data. Recipe data may include pick positions, retraction paths, speed of part handling, placement position data, etc. The processing element 94 may be configured to direct the robotic arm 18 to couple to the correct end of arm tool based at least in part on the recipe data and/or scanned data.

The processing element 94 may be configured to receive, via the user interface 92 and/or the communication element 88, a signal representative of a number of products to be wrapped in a single package. The recipe data may include a number of products formed by the trim press 12 and a number of rows on the end of arm tool. The processing element 94 may then be configured to receive a signal representative of a cycle of the trim press 12 and track a number of cycles of the trim press 12 to determine a number of products on the trim press receiver 16. The processing element 94 may be configured to determine whether a number of products on the trim press receiver 16 is substantially equal to or greater than the number of products for the single package.

When the determined number of products on the trim press receiver 16 is equal to or greater than the number of products for the single package, the processing element 94 may be configured to direct the actuator 48 of the strip away mechanism to shift the rods so that the tabs engage the products on the support elements of the trim press receiver. The processing element 94 may be configured to direct the actuator 54 to horizontally shift the strip away mechanism engaging the products to separate the number of products equal to or greater than the number of the single package on the support elements, thereby forming gaps in the stacks of products. The processing element 94 may be configured to direct the robotic arm 18 to position the end of arm tool next to the support elements of the trim press receiver 16. The processing element 94 may direct the actuators 58, 62, 66 to position the pusher rake and the follower rack to engage the products for the single package on the support elements and load them onto the end of arm tool coupled to the robotic arm 18.

The processing element 94 may be configured to direct the robotic arm 18 to move the end of arm tool to the loading station 20. The processing element 94 may be configured to direct the robotic arm 18 to line up a first row of the end of arm tool with the unloading tool of the loading station 20 and direct the unloading rake to push the first row of stacks of products onto the unloading tool. The processing element 94 may be configured to direct the unloading tool to shift horizontally with the products loaded thereon so that the push loader pushes each stack of products in the first row to the wrapping station 22 so that the first row of stacks of products form a single stack of products. The processing element 94 may be configured to direct the robotic arm 18 to lower or raise the end of arm tool so that the next row of stacks of products on the end of arm tool can be unloaded onto the unloading tool via the unloading rake. The processing element 94 may be configured to direct the unloading tool and push loader to push the second row of stacks of products to the wrapping station. The processing element 94 may be configured to repeat this process until the end of arm tool is completely unloaded. The processing element 94 may then direct the wrapping station 22 to wrap the single stack of products.

The flow chart of FIG. 18 depicts the steps of an exemplary method 100 of handling products received from a trim press. In some alternative implementations, the functions noted in the various blocks may occur out of the order depicted in FIG. 18. For example, two blocks shown in succession in FIG. 18 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-17. The steps of the method 100 may be performed by the control system 24 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium (s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, a signal representative of equipment classification, identification, type, or the like may be received. The signal may be received by the processing element, the user interface, and/or the communication element of the control system. This step may include capturing, via the scanning device, scanning data of the trim press receiver, the loading station, the end of arm tool, the trim press, etc. This step may include scanning, via the scanning device, a bar code, QR code, text code, RFID chip, or the like. This step may also include receiving a recipe from the memory element attached to the end of arm tool.

Referring to step 102, recipe data may be retrieved, via the processing element and/or the communication element, from the memory element of the control system, and/or from the memory element on the end of arm tool based at least in part on the scanning data. Recipe data may include pick positions, retraction paths, speed of part handling, placement position data, etc. This step may include directing, via the processing element, the robotic arm to couple to the correct end of arm tool based at least in part on the recipe data and/or scanned data.

Referring to step 103, a signal representative of a number of products to be wrapped in a single package is received via the processing element, the user interface, and/or the communication element. In some embodiments, the recipe data may include a number of products formed by the trim press per cycle and a number of rows on the end of arm tool.

Referring to step 104, a number of cycles of the trim press may be tracked, via the processing element. In some embodiments, a signal representative of a cycle of the trim press may be received, via the processing element and/or the communication element, and used by the processing element to track the number of products on the trim press receiver. This step may include determining when the number of products on the trim press receiver is substantially equal to or greater than the number of products for the single package.

Referring to step 105, the strip away mechanism is actuated to form gaps in the stacks of products. This step may include directing, via the processing element, an actuator of the strip away mechanism to actuate to engage the products. This step may include directing, via the processing element, the actuator to shift the rods so that the tabs connected thereto engage the products on the support elements of the trim press receiver. This step may include directing, via the processing element, an actuator of the strip away mechanism to shift horizontally, thereby horizontally shifting the products to separate the number of products equal to or greater than the number of the single package on the support elements of the trim press receiver and forming gaps in the stacks of products. This step may be performed when the number of products on the trim press receiver is equal to or greater than the number of products for the single package as determined by the processing element. This step may include directing, via the processing element, the robotic arm to position the end of arm tool next to the support elements of the trim press receiver.

Referring to step 106, the pusher rake of the trim press receiver is actuated to load the portions of the stacks of products onto the end of arm tool. This step may include directing, via the processing element, the actuators associated with the pusher rake to position the pusher rake to engage the products for the single package on the support elements and load them onto the end of arm tool coupled to the robotic arm. This step may also include directing, via the processing element, the actuators associated with the leading rake to position the leading rake to compress the products for the single package against the pusher rake on the support elements and help load them onto the end of arm tool.

Referring to step 107, the robotic arm may be actuated to transport the end of arm tool and the products loaded thereon to the loading station. This step may include directing, via the processing element, the robotic arm to move the end of arm tool to the loading station. This step may include directing, via the processing element, the robotic arm to line up a first row of the end of arm tool with the unloading tool of the loading station.

Referring to step 108, the unloading rake and the leading rake may be actuated to push the products on the end of arm tool onto the unloading tool. This step may include directing, via the processing element, actuators to cause the unloading rake and the leading to push the first row of stacks of products onto the unloading tool. This step may include directing, via the processing element, the robotic arm to lower or raise the end of arm tool so that the next row of stacks of products on the end of arm tool can be unloaded onto the unloading tool via the unloading rake.

Referring to step 109, the unloading tool and the push loader are actuated in order to push the products to the wrapping station. This step may include directing, via the processing element, actuators to cause the unloading tool to shift horizontally with the products loaded thereon and directing, via the processing element, actuators to cause the push loader to push each stack of products in the first row to the wrapping station in order to form a single stack of products loaded onto the wrapping station. Steps 108 and 109 may be repeated until the end of arm tool is completely unloaded.

Referring to step 110, the products are wrapped in a material. This step may include sending, via the processing element and/or communication element, a signal to the wrapping station to wrap the products when it is determined, via the processing element, that the number of products for a single package is present at the wrapping station.

The method 100 may include additional, less, or alternate steps and/or device(s), including those discussed elsewhere herein.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A trim press receiver for receiving arrays of products from a trim press, the trim press receiver comprising:
   support elements configured to receive the arrays of products and support the arrays of products in rows of stacks of products;
   a strip away mechanism configured to form gaps in the stacks of products; and
   a pusher rake configured to extend into the gaps and press portions of the stacks of products off of the support elements.

2. The trim press receiver of claim 1, wherein the strip away mechanism is shiftable along longitudinal lengths of the support elements.

3. The trim press receiver of claim 2, wherein the strip away mechanism comprises a plurality of rods extending between and transverse to the support elements, each of the rods including tabs configured to engage portions of the products.

4. The trim press receiver of claim 3, wherein the plurality of rods comprise a first set of rods configured to shift transversely relative to the support elements in a first direction, and a second set of rods configured to shift in a second direction opposite to the first direction.

5. The trim press receiver of claim 4, further comprising a first actuator configured to actuate the strip away mechanism along the longitudinal lengths of the support elements, a second actuator configured to shift the first set of rods relative to the second set of rods, a third actuator configured to shift the pusher rake along the longitudinal lengths of the support elements, and a fourth actuator configured to shift the pusher rake transversely relative to the support elements.

6. The trim press receiver of claim 5, further comprising a controller configured to—
   receive a signal representative of a cycle of the trim press;
   receive a signal representative of a number of products for a customer set;
   determine whether an amount of products on the support elements is equal to the number of products for the customer set;
   direct the second actuator to actuate the first set of rods relative to the second set of rods to engage the rows of products on the support elements;
   direct the first actuator to actuate the strip away mechanism to form the gaps;
   direct the fourth actuator to actuate the pusher rake so that it extends into the gaps; and
   direct the third actuator to actuate the pusher rake to press the portions of the rows of stacks of products off of the support elements.

7. The trim press receiver of claim 1, further comprising—
   a plurality of flexible fins extending parallel with the support elements and configured to hold the products on the support elements; and
   a leading rake configured to press the portions of the rows of products against the pusher rake as the rows of products are moved off of the support elements.

* * * * *